No. 655,225. Patented Aug. 7, 1900.
G. V. GRESS.
MAGAZINE PHONOGRAPH.
(Application filed Apr. 12, 1898.)
(No Model.) 5 Sheets—Sheet 1.
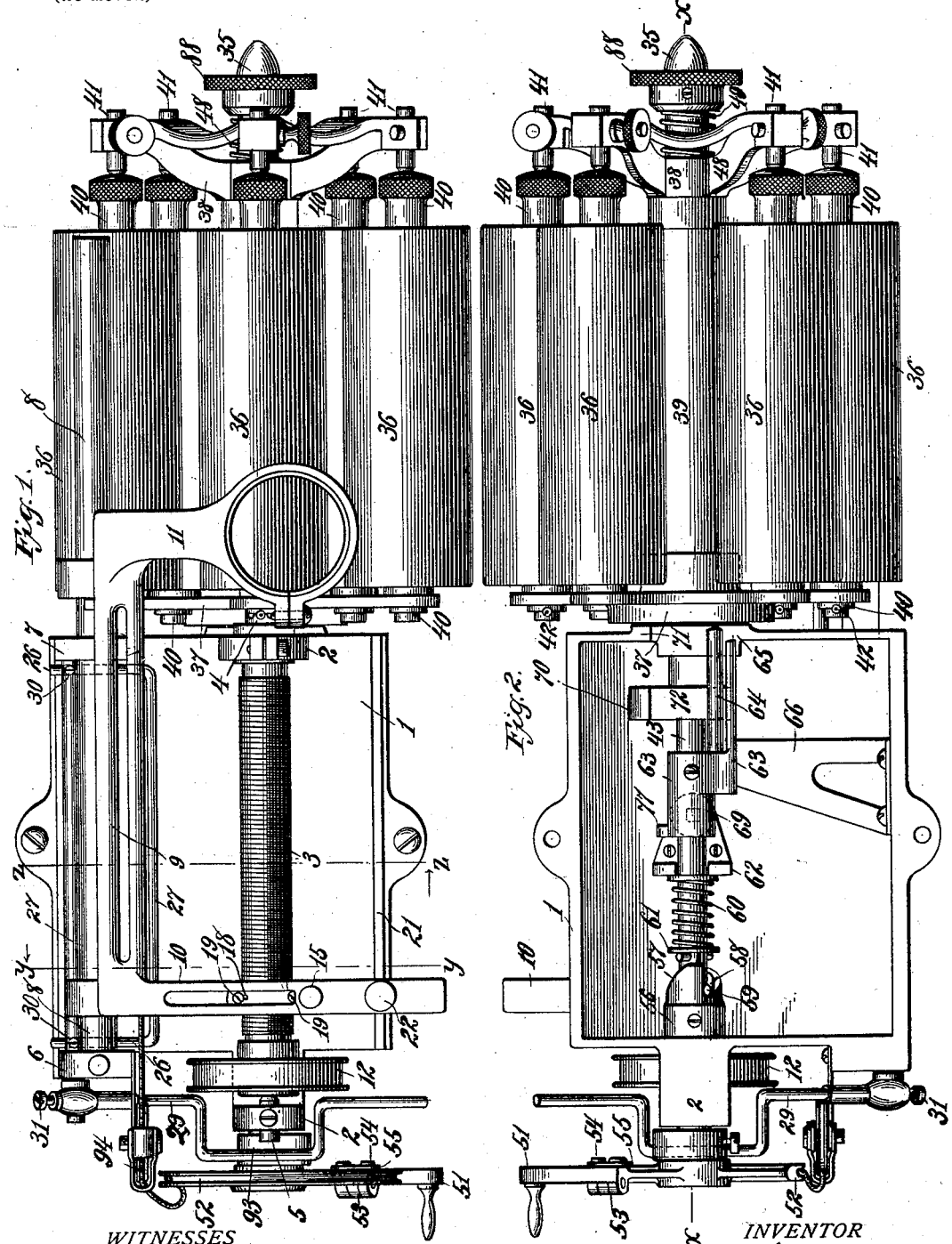
WITNESSES
INVENTOR
George V. Gress
By C. J. Stockman Attorney No. 655,225. Patented Aug. 7, 1900.
G. V. GRESS.
MAGAZINE PHONOGRAPH.
(Application filed Apr. 12, 1898.)
(No Model.) 5 Sheets—Sheet 2.
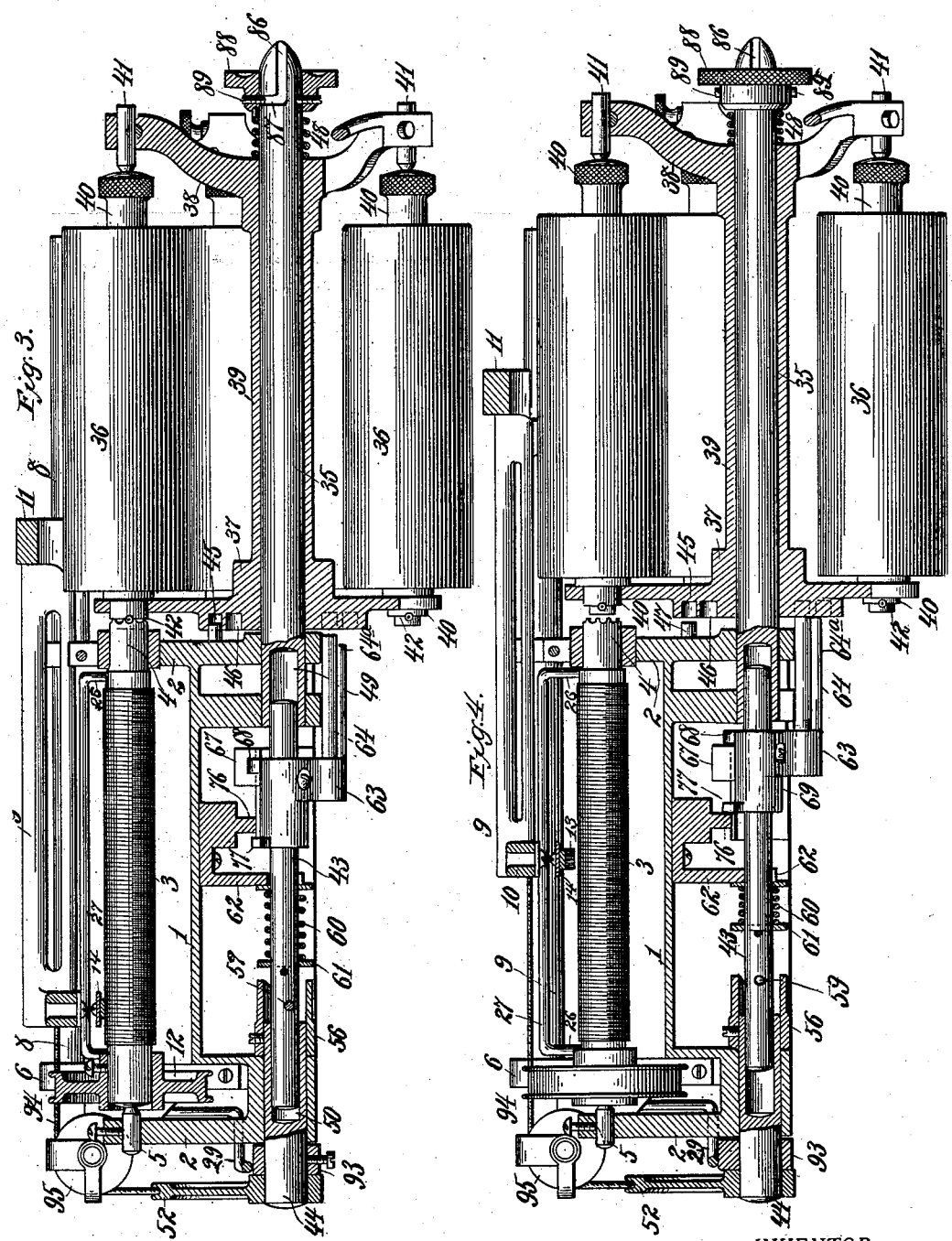
WITNESSES
INVENTOR
George V. Gress
By C. J. Stockman Attorney No. 655,225. Patented Aug. 7, 1900.
G. V. GRESS.
MAGAZINE PHONOGRAPH.
(Application filed Apr. 12, 1898.)
(No Model.) 5 Sheets—Sheet 3.
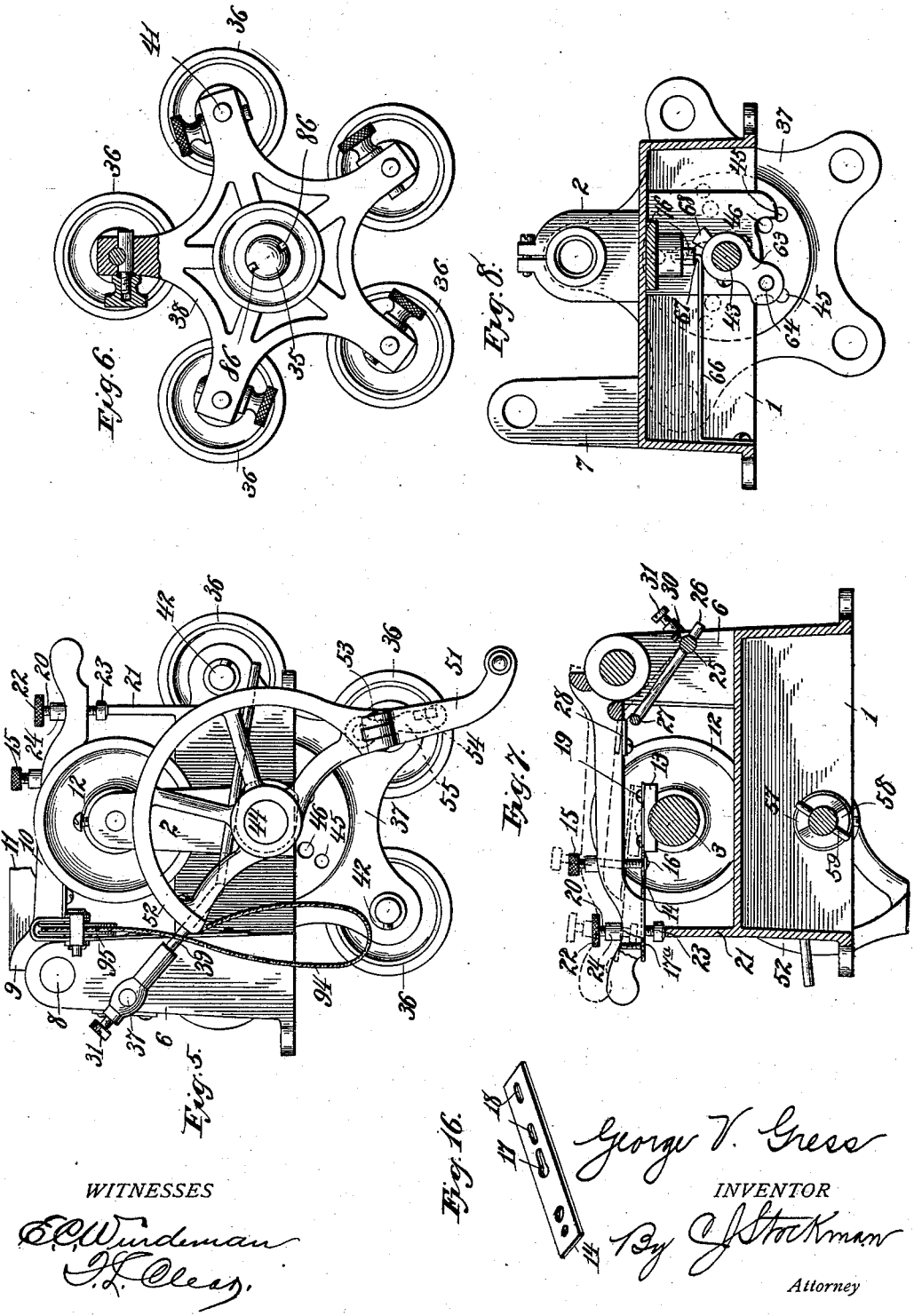
WITNESSES
INVENTOR
George V. Gress
By J. Stockman
Attorney

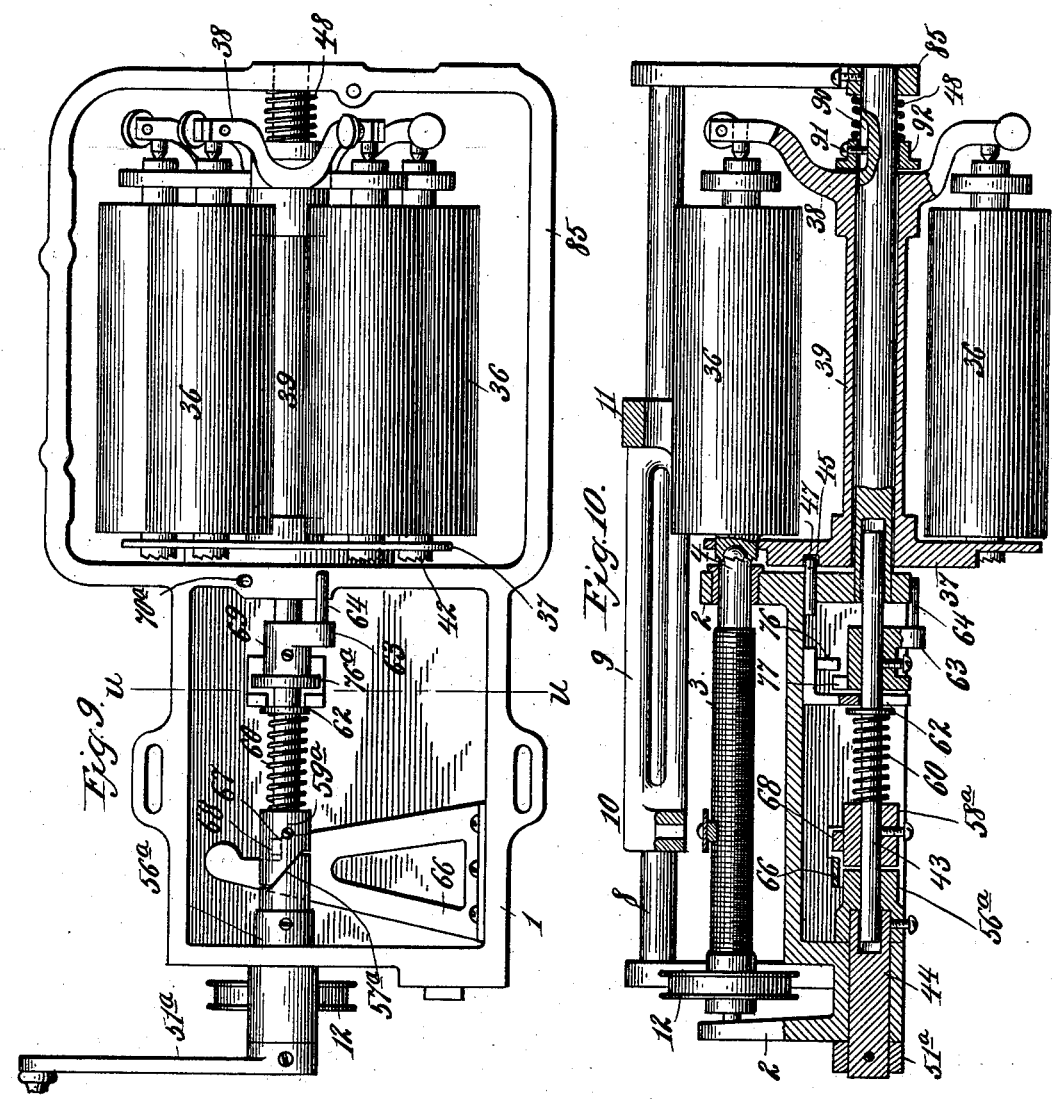

No. 655,225. Patented Aug. 7, 1900.
G. V. GRESS.
MAGAZINE PHONOGRAPH.
(Application filed Apr. 12, 1898.)
(No Model.) 5 Sheets—Sheet 5.
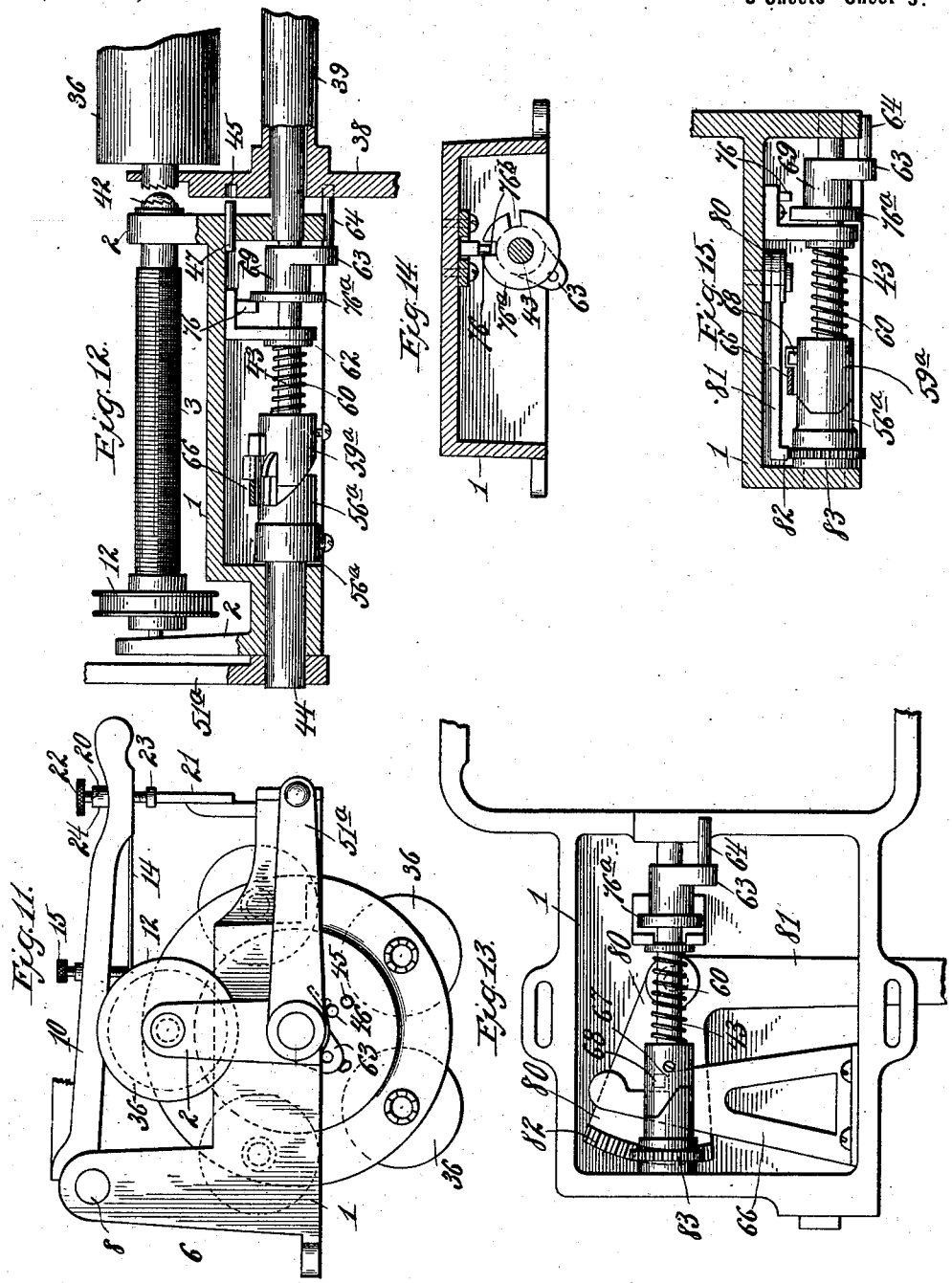
WITNESSES
INVENTOR
George V. Gress
By C. J. Stockman, Attorney

UNITED STATES PATENT OFFICE.

GEORGE V. GRESS, OF ATLANTA, GEORGIA.

MAGAZINE-PHONOGRAPH.

SPECIFICATION forming part of Letters Patent No. 655,225, dated August 7, 1900.

Application filed April 12, 1898. Serial No. 677,391. (No model.)

*To all whom it may concern:*

Be it known that I, GEORGE VALENTINE GRESS, a citizen of the United States, residing at Atlanta, in the county of Fulton and State of Georgia, have invented certain new and useful Improvements in Multiplex-Cylinder Phonographs; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention has particular reference to that class of phonographs called "multiplex-cylinder," wherein are employed a series of cylinders successively brought into operative relation with the feed-shaft and recording or reproducing point; but many features of the invention are applicable to phonographs having a single cylinder; and the invention consists in certain peculiarities in the construction and arrangement of the parts and in certain novel combinations of the parts, substantially as hereinafter described, and particularly pointed out in the subjoined claims.

The objects of the invention are as follows: first, to provide the half-nut that engages the feed-shaft for transmitting longitudinal motion from said shaft to the diaphragm-support with means whereby said half-nut may have a maximum range of adjustment relatively to said shaft; second, to provide means whereby the diaphragm-support will be properly guided in its movement over the wax cylinder and will be adjustable relatively to said cylinder to compensate for the reduction in the thickness thereof when shaved; third, to provide improved means for holding the half-nut and diaphragm-support elevated out of operative relation with the feed-shaft and wax cylinder, respectively, and particularly to provide a construction whereby said holding means will operate automatically to raise and hold the half-nut and diaphragm-support elevated in the return of said parts to the starting-place; fourth, to provide simplified means whereby said return of the half-nut and diaphragm-support is accomplished automatically during the operation of bringing a different wax cylinder into operative position; fifth, to provide improved means for shifting the cylinders in multiplex-cylinder phonographs to bring a different cylinder into operative relation with the recording or reproducing point, and, sixth, to provide means whereby the battery of cylinders and their supporting parts may be quickly removed from the machine in entirety and another complete battery substituted. These several objects are accomplished by the constructions shown in the accompanying drawings, wherein—

Figure 1 is a top plan view of a construction embodying all of my improvements and showing the preferred means for carrying out the several objects. Fig. 2 is a bottom plan view of the same with the parts in their normal positions. Fig. 3 is a longitudinal section on the line $xx$ of Fig. 2. Fig. 4 is a central longitudinal section showing the positions of the parts at one stage of the operation of bringing a different cylinder into operative position. Fig. 5 is a view of one end of the machine. Fig. 6 is a view of the other end of the machine, partly in section. Fig. 7 is a transverse section on the line $yy$ of Fig. 1 with parts broken away and showing in full and dotted lines, respectively, the adjustment of the diaphragm-support and the means for holding said diaphragm-support and the half-nut out of operative position. Fig. 8 is a transverse section on the line $zz$ of Fig. 1. Fig. 9 is a bottom plan view of another form of the device. Fig. 10 is a central longitudinal section of the form shown in Fig. 9. Fig. 11 is a view of one end of the same machine. Fig. 12 is a central longitudinal section of the same with the parts in the positions they occupy in shifting the cylinders. Fig. 13 is a view of a part of a modified form of machine. Fig. 14 is a section on the line $uu$ of Fig. 9. Fig. 15 is a detail of part of the form shown in Fig. 13, and Fig. 16 is a detail view of the spring for supporting the half-nut.

The same reference characters designate the same parts in the several views.

1 designates the base of the machine, having uprights 2 at its ends, forming bearing for the threaded feed-shaft 3, one end of which latter is constructed to form a clutch member 4 for engaging the contiguous end of the mandrel-shaft, hereinafter described, and has its other end journaled upon a removable center pin 5 to permit it to be removed when desired. Said base 1 is also provided with standards 6 and 7, which support a bar 8, that forms a guide for a sleeve 9 to travel upon, said sleeve having forwardly-projecting arms 10 and 11 at its ends, the former of which carries means, hereinafter described, for engaging said feed-shaft to communicate longitudinal motion to the sleeve, and the latter of which arms carries the usual diaphragm. The feed-shaft 3 is provided with a pulley 12, actuated by a belt from a suitable motor to rotate said shaft.

The means engaging the feed-shaft 3 to cause the recording or reproducing point to be fed over the rotating wax cylinder or phonogram consists of a nut-section 13, carried by a spring-arm 14, secured at its forward end to the arm 10, and for the purpose of adjusting said spring to regulate the engagement of said nut-section with the feed-shaft I employ an adjusting-screw 15, which is threaded in said arm 10 and extends through the arm 14, beneath which latter it has a head 16. The arm 14 has an opening 17, one end of which is wider than said head 16 to permit the latter to pass through and the other end of which is narrower than said head to prevent disengagement of said head and spring-arm when the parts are assembled, and said spring-arm is removably secured to the arm 10 by a screw 17ª. Said spring-arm is, furthermore, formed with elongated slots 18, through which pass the screws 19, that secure the nut-section 13 thereto. Thus the half-nut 13 is adjustable longitudinally upon the spring-arm, and the end of the spring-arm is adjustable toward and from the feed-shaft 3, whereby proper engagement of said half-nut with the feed-shaft is at all times insurable.

In lieu of the usual means for causing the diaphragm-support and nut-carrying arm to move in a truly-straight line over the wax cylinder and feed-shaft, respectively, I employ an adjustable screw 20, which extends through the arm 10 and rests upon the upper straight edge of a guide-flange 21, projecting from the forward end of the base 1, whereby said screw not only guides the parts stated, but when turned will adjust the diaphragm-support relatively to the cylinder to conform to the thickness of the latter, thus enabling wax cylinders to be used until by repeated shaving thereof they have been entirely destroyed. Preferably the adjusting-screw 20 has heads 22 and 23 at each end, the former for convenience in adjusting it and the latter to rest upon the guide 21 without marring the same, and is provided with a loose collar 24 to limit the adjustment.

A novel means has been devised by me for raising the arms 10 and 11, with the parts carried thereby, to stop the recording or reproducing without stopping the machine. For this purpose a shaft 25 is journaled in the standards 6 and 7 and has between the latter two forwardly and upwardly extending arms 26, connected by a rod 27. Normally the position is such that the rod 27 is slightly below the plane of the under side of arm 10; but when said rod is raised it engages said arm and raises the same, together with arm 11, thus disengaging the half-nut from the feed-shaft and the recording or reproducing point from the wax cylinder. The under side of said arm 10 is formed or provided with a shoulder 28, so located thereon that when the parts have been raised the required extent it will be engaged by said rod 27, whereby said parts will be held in elevated position automatically until by further raising said arm 10 by hand its shoulder is disengaged from said rod to allow the latter to drop by gravity to its former position, when said arms 10 and 11 may be lowered to operative position. The end of the shaft 25 is provided with an operating lever or handle 29. In order to permit adjustment the arms 26 extend loosely through the shaft 25 and are held by screws 30, and the handle 29 is secured to the end of said shaft by the adjustable screws 31. This latter feature is especially important when, as hereinafter described, the handle is operated automatically by an eccentric.

As thus far described the improved constructions of parts are applicable to single-cylinder phonographs; but my invention has more particular relation to that type of phonographs (called "multiplex-cylinder phonographs") wherein are employed a plurality of cylinders which are brought one at a time under the action of the recording or reproducing points. In the accompanying drawings I have shown the latter type of machine, and while I have shown five cylinders in each case I wish it understood that the features related to said type of machine are not limited to employment with said number of cylinders, but that my invention contemplates the use of any number of cylinders more than one.

35 designates an axial rod or bar, which projects from the end of the base 1 and supports the frame carrying the mandrels 36, upon which latter are mounted the usual wax cylinders or phonograms. For convenience this frame is hereinafter called a "reel," and it comprises two suitably-constructed heads 37 and 38, connected by a sleeve 39, rotatably and slidably mounted on said rod 35. The mandrels must be capable of independent rotation between said heads, and are capable of independent removal therefrom to enable a change of wax cylinder upon any one of the same. For these purposes the shaft 40 of each is journaled at one end in said head 37, and its other end is journaled upon a removable or movable center pin 41, supported by the head 38. The inner ends of said shafts 40 project beyond said head 37 and are suitably constructed to interlock with the clutch member 4 at the end of the feed-shaft 3, as shown at 42, to cause the feed-shaft and the adjacent mandrel to rotate in unison.

As thus far described the invention is similar in substance to others previously proposed, and, like other machines of this type, in bringing a different cylinder into operative relation with the feed-shaft the frame carrying the cylinders is moved longitudinally upon its axis to disengage a mandrel-shaft 40 from the feed-shaft and then turned the exact distance between two consecutive cylinders and returned longitudinally to engage the mandrel-shaft that is now opposite the feed-shaft 3 with the latter; but the mechanism heretofore used for securing this result has been comparatively complicated, expensive, liable to get out of order, and unreliable in action, because the construction has contained many delicate parts and the return of the reel has produced a jar or shock which has caused the parts to be forced endwise, and thus broken or moved out of place. These disadvantages are overcome by my improved construction of operating means, which consists, generically, of two separate shafts 43 and 44, mounted in the base 1 of the machine, one of which shafts, 43, is capable of both longitudinal and rotary motion in its bearings, suitable mechanism for locking said shaft 43 against rotation until it has moved longitudinally a predetermined distance, a suitable device movable with said shaft 43 for engaging the reel and imparting the motion of said shaft thereto, and suitable devices controlled by the action of said shaft 44 and so constructed as to coöperate with the locking mechanism above referred to in imparting successive longitudinal and rotary motion to said shaft 43. This generic idea may be embodied in different forms of mechanism, several of which are shown and described in the present case without departing from the spirit of my invention.

The detail constructions preferred by me are as follows: The reel-head 37 is provided with two series of holes 45 and 46, spaced to correspond with the location of the cylinder-carrying mandrels. The outer series 45 are adapted to receive a stationary pin 47, projecting from the base 1, whereby the reel is held in position for engagement of a mandrel-shaft 40 with the feed-shaft 3. At the outer end of the rod 35 is a spring 48, which will yield to pressure to permit the reel to move to the right and will return the same when said pressure is released. The inner end of said rod 35 has an opening 49, which receives the adjacent end of the shaft 43, and the other end of said shaft is supported in an opening 50 in the end of the shaft 44, whereby the longitudinal movement above specified is permitted.

In the preferred construction of the device there is shown a peripherally-grooved segment 52, to which is hinged a crank-arm 51, which crank-arm is capable of being folded against the segment for convenience when the device is not in use and is secured in extended position by means of a hook 55 and lug 54. The shaft 44 is rotated by turning said crank-arm and segment, and the segment has a further function, hereinafter fully set forth; but, if desired, the shaft 44 may be provided with an operating-handle $51^a$ of ordinary form, as shown in Fig. 9, without departing from the spirit of the invention.

The contiguous ends of the shafts 43 and 44 are provided with clutch devices relatively so constructed as to coact with the locking devices above referred to, and which are hereinafter specifically described, in translating rotary motion of the shaft 44 into successive longitudinal and rotary motion of the shaft 43. This clutch device, as shown best in Figs. 2 and 7, may consist of a collar 56, mounted on the inner end of the handle-shaft 44 and having recesses in its end formed with walls sloped to form two end cam-surfaces 57 and 58, which cam-surfaces are engaged by a pin 59, projecting laterally from both sides of the adjacent end of the shaft 43, or, as shown in Figs. 9 and 13, said clutch may consist of two locking-jaws $56^a$ and $59^a$, one on each shaft, which have the adjacent sides of their walls sloped, as shown at $57^a$, to form engaging end-faced cams. In either construction the clutch-cams will operate when the handle-shaft 44 is turned and the shaft 43 is locked against oscillation to move said shaft 43 longitudinally to the right. The shaft 43 is pressed yieldingly to the left by means of a spring 60, having at one end an abutment 61, fixed to said shaft, and at its other end an abutment 62, projecting from the base 1 of the machine, whereby said clutch devices on the contiguous ends of the shafts 43 and 44 are held in engagement with each other at all times. Said shaft 43 is also provided with an arm 63, having a pin 64, which pin when in its normal position just clears the head 37 of the reel carrying the battery of cylinder-supporting mandrels and is in registry with the adjacent hole 46 in said head and also engages the surface 65 of the base 1, whereby oscillation too far in one direction is prevented. Said arm 63 is preferably provided with a pin $64^a$, which is parallel with said pin 64 and engages the surface of said head 37 when the pin 64 has been inserted as far as necessary in the hole 46. The means for locking said shaft 43 against rotation or oscillation during a portion of the rotation or oscillation of said shaft 44, so as to compel said shaft 43 first to move endwise, will now be described.

Secured at one end to the base 1 is a spring-arm 66, having a ledge 67 at its free end, which ledge is adapted to engage a lug 68, which moves with the shaft 43. This lug in the one construction, as shown best in Figs. 3 and 4, projects from a sleeve 69, which is fixed to said shaft 43 and carries the pins 64 and $64^a$; but in the form of the device employing two end-faced cams said lug preferably projects from the cam or clutch member 59ª. In the normal position of the parts this lug engages the ledge 67 and prevents rotation of the parts while the shaft 44 is being turned in one direction a certain predetermined distance, but allows said shaft 43 to move endwise. This ledge is of such length that when said shaft 43 is moved to the right the distance which results in disengaging the hole 45 in the head 37 from the pin 47 the lug 68 will have passed beyond the ledge, so that further rotation of the shaft 44 will cause the shaft 43 to rotate or oscillate and carry with it the reel-frame and cylinders the distance between two consecutive mandrels. Suitable stops to be engaged by the pin 64 when thrown upward for limiting the oscillation of said shaft 43 and reel are provided, which stops may consist of alined projections 70 and 71, respectively formed integral with the base 1 and with a hanger 72, supporting the shaft 43, as shown in Fig. 2, or, if preferred, of a screw 70ª, as shown best in Fig. 9. The stop or stops are so placed as to be engaged by said pin 64 when the reel has been rotated an exact subdivision of the circle corresponding to the location of the mandrels therein. One of the holes 45 in the head 37 is at this time in registry with the locking-pin 47. To engage the mandrel-shaft 40, now opposite the feed-shaft 3, with said feed-shaft and the hole 45 with the locking-pin 47, the shaft 44 is turned, by means of the crank 51 or 51ª, in the opposite direction to that imparted to it in accomplishing the disengagement and rotation above specified, and during the first part of this movement the shaft 43 is locked against rotation, but allowed to move endwise to the left, by means of a stationary pin 76, projecting from the base 1 into position to be engaged by a shoulder 77, projecting from the sleeve 69, as shown in Fig. 4, or, as shown in Figs. 9, 10, and 14, the same result may be accomplished by means of a collar 76ª on the sleeve, having two radial notches 76ᵇ to engage said pin 76, said notches being spaced to correspond with the spacing of the mandrels. The pin 76 and the shoulder 77 are so arranged that when the parts are in their normal positions (shown in Fig. 3) the pin 76 is to the right and in the rear of the shoulder or lug 77; but after the shaft 43 has moved endwise its full extent the shoulder will have moved to the right of the pin 76, as shown in Fig. 4, just sufficient to permit it to pass by the said pin when shaft 43 is turned. The lug and pin will also be so arranged that when the shaft 43 has completed its turning movement the front face of the lug 77 will be very slightly in rear of the rear face of the pin, just sufficient to permit the lug to move behind the pin immediately the spring 60 begins to move the shaft 43, which it will do as soon as the operator begins to reverse the movement of the crank. Continued reverse movement of the crank will result in endwise movement of the shaft 43 until the lug 77 has passed out of engagement with the pin 76, when said shaft will be free to turn and resume its normal position. The same action occurs with the construction embodying the notched collar 76ª, one of the notches being for the purpose of affording a passage-way for the pin 76 when the shaft 43 is moved endwise to the right and the other notch to temporarily engage the pin 76 when the shaft 43 moves to the left in a manner similar to that of the lug 77. The endwise movement of the shaft 43 during the engagement of the pin 76 and lug 77 will be sufficient to permit the mandrel-shaft 40 to engage the feed-shaft 3 and to withdraw the pin 64 from the hole 46 in the head 37 of the reel. The shaft 43 will then be free to turn and restore the pin 64 to its normal position.

It will readily be seen that as the turning of the clutch member 44 is controlled by the operator an easy and gradual return of the reel and the parts carried thereby is assured and the shock and consequent disarrangement of the parts inseparably connected with previous proposals prevented.

In the return endwise movement of the shaft 43 the lug 68 will be moved opposite the spring-arm 66, and when the shaft is being rotated to return the pin 64 to its normal position said lug will engage the spring-arm and force it back until the lug clears it, when it will return to its normal position, bringing the ledge 67 beneath the lug.

In the modified construction shown in Figs. 13 and 15 is a different connection for operating the device. In this form the handle-shaft 44 does not project beyond the end of the case or frame, and said shaft instead of being operated by a crank is operated by a pivoted lever having two arms 80 and 81, the latter extending into position to be operated by hand. The arm 80 is provided at one end with a toothed segment 82, which intermeshes with a pinion 83 upon the clutch member carried by the shaft 44. As the lever 81 is moved sidewise the segment will rotate the pinion 83 and shaft 44. The operation of the device is otherwise identical with those above described.

As shown best in Figs. 1, 2, 3, and 4, means may be provided by which the reel and battery of cylinders may be removed at once from the machine. When this means is employed, the frame 85, shown in the other form as supporting the outer end of the axial bar, is dispensed with, and said outer end of the axial bar is formed with longitudinal recesses or channels 85 at its opposite sides, terminating at the inner end in the channels 87, extending at right angles therewith. The cap 88, to which the spring 48 is preferably secured, holds the reel upon said axial bar and is provided with inwardly-projecting pins 89, which normally project into the channels 87, and thus lock the cap to the bar. When it is desired to remove the reel and cylinders, the cap is turned until the pins 89 register with the slots 86 and may then be withdrawn, together with the spring 48, to permit the free removal of the reel and cylinders. The outer end of the bar may, as shown in Fig. 10, be formed with a channel 90, into which projects a pin 91, extending from a collar 92, which collar in this form of the device forms the inner abutment for the spring 48, whereby the reel is guided in its reciprocations upon the bar.

In the illustration of one form of the device I have also shown means whereby the rotation of the shaft 44 operates, in addition to the shifting of the cylinders, to raise the diaphragm-support above the wax cylinder and the half-nut above the plane of the feed-shaft and to return said parts to the starting-place. To accomplish the first of these purposes, a cam 93 is fixed on the outer end of said shaft 44 and supports the arm 29 of the elevating means above described. Normally this arm rests upon the shorter side of the cam or eccentric, so that when the shaft 44 is rotated the longer side of said cam is brought into engagement with the arm 29 and lifts the same, thus raising the rod 27 and elevating the arms 10 and 11, which are engaged with said rod 27. The automatic return of the diaphragm-support and half-nut to the starting-place is accomplished by means of a cord 94 or other suitable device, which is secured at one end to the arm 10 and at its other end to the segment 52, above described, and extends over a pulley 95. Thus when the operating-crank is turned to rotate the shaft 44 the segment will be turned and will draw on said cord, thus moving the sleeve 9 and connected parts to the left, during which return movement said parts are supported by the elevated rod 27. The peripheral groove in the segment 52 receives the cord while the latter is being drawn to the left and insures the proper operation of these parts.

I do not wish to be understood as limiting myself to the details of construction above set forth, as many forms of mechanism other than those above described may be employed for carrying out my invention without departing from the spirit thereof.

Having thus described the invention, what I claim is—

1. In a multiplex-cylinder phonograph, the combination with the longitudinally-movable and rotatable reel carrying the cylinders, of a cylinder-shifting means comprising two shafts, devices for locking one of said shafts against rotation until it has moved endwise a predetermined distance, devices carried by the latter shaft for engaging the reel, and means connecting the contiguous ends of said shafts and coacting with said locking devices in translating rotary motion of the one shaft into successive longitudinal and rotary motion of the other shaft, substantially as shown and described.

2. A cylinder-shifting means for multiplex-cylinder phonographs containing a first and a second shaft mounted end to end, a clutch having one member mounted on the first shaft and its other member mounted on the second shaft, said clutch having cam-surfaces, and a device coacting with said clutch in translating turning movement of the one shaft into successive endwise and turning movement of the other shaft.

3. A cylinder-shifting means for multiplex-cylinder phonographs, comprising a handle-shaft, a second shaft, a clutch one member of which is mounted upon the handle-shaft and the other member upon said second shaft, said clutch having cam-surfaces, a spring pressing said members toward each other, and a non-rotating lock for the second shaft, freed by an endwise movement thereof.

4. A cylinder-shifting means for multiplex-cylinder phonographs, comprising a cylinder-carrying reel having locking-holes in one head, a locking device engaged with and freed from the reel by endwise movement of the reel, a handle-shaft, a second shaft adapted to connect the handle-shaft and reel by an endwise movement of said second shaft, a clutch connecting said handle-shaft and second shaft and having cam-surfaces, and a non-rotating lock for the second shaft freed by an endwise movement of said shaft.

5. A cylinder-shifting means for multiplex-cylinder phonographs, comprising a cylinder-carrying reel having locking-holes in one head, a locking device engaged with and freed from the reel by an endwise movement of said reel, a handle-shaft, a second shaft adapted to connect the handle-shaft and reel by an endwise movement of the second shaft, a clutch connecting said handle-shaft and second shaft and having cam-surfaces, a non-rotating lock for the second shaft freed by the endwise movement of the latter, and stops limiting the oscillations of the second shaft.

6. A cylinder-shifting means for multiplex-cylinder phonographs, comprising a cylinder-carrying reel having holes in one head, a locking device engaged with and freed from the reel by endwise movement of said reel, a handle-shaft, a second shaft adapted to connect the handle-shaft and reel by endwise movement of said second shaft, a clutch connecting said shafts and having cam-surfaces, a lug movable with the second shaft, and a spring-arm engaging said lug and preventing rotation until cleared by the endwise movement of the second shaft.

7. A cylinder-shifting means for multiplex-cylinder phonographs, comprising a cylinder-carrying reel having holes in one head, a locking device engaged with and freed from the reel by endwise movement of the reel, a handle-shaft, a second shaft adapted to connect the handle-shaft and reel by endwise movement of the second shaft, a clutch connecting said shafts and having cam-surfaces, a lug movable with said second shaft, a spring-arm engaging the same and preventing rotation until cleared by the endwise movement of the second shaft, and stops limiting the oscillations of the second shaft.

8. A cylinder-shifting means for multiplex-cylinder phonographs, comprising a cylinder-carrying reel, having locking-holes in one head, a locking device engaged with and freed from the reel by endwise movement of said reel, a handle-shaft, a second shaft adapted to connect the handle-shaft and reel by endwise movement of said second shaft, a clutch connecting the contiguous ends of said shafts, said clutch having cam-surfaces, a spring for returning said second shaft, and a non-rotating lock for said second shaft freed by endwise movement thereof.

9. A cylinder-shifting means for multiplex-cylinder phonographs, comprising a cylinder-carrying reel having locking-holes in one head, a locking device engaged with and freed from the reel by endwise movement of the latter, a handle-shaft, a second shaft adapted to connect the handle-shaft and reel by its endwise movement, a clutch connecting the contiguous ends of said shafts and having cam-surfaces, a spring for returning the second shaft, a non-rotating lock for the second shaft, freed by the endwise movement thereof, and stops limiting the oscillation of the second shaft.

10. A cylinder-shifting means for multiplex-cylinder phonographs, comprising a cylinder-carrying reel having locking-holes in one head, a locking device engaged with and freed from the reel by endwise movement of the latter, a handle-shaft, a second shaft adapted to connect the handle-shaft and reel by endwise movement of the second shaft, a clutch connecting the contiguous ends of said shafts and having cam-surfaces, a lug movable with the second shaft, a spring engaging said lug and preventing rotation of the second shaft until cleared by the endwise movement thereof, and a spring for returning said second shaft.

11. A cylinder-shifting means for multiplex-cylinder phonographs, comprising a cylinder-carrying reel having locking-holes in one head, a locking device engaged with and freed from the reel by endwise movement of the reel, a handle-shaft, a second shaft adapted to connect the handle-shaft and reel by endwise movement of the second shaft, a clutch connecting the contiguous ends of said shafts and having cam-surfaces, a pin fixed in the machine-base, and a device movable with the second shaft and engaged by said pin to prevent oscillation of the second shaft.

12. A cylinder-shifting mechanism for multiplex-cylinder phonographs, comprising a handle-shaft, a second shaft-interlocking jaw-clutches formed to provide end-faced cams, one part mounted on the handle-shaft and the other part upon the second shaft, said second shaft having a longitudinal reciprocating and oscillating movement, and locking devices for the second shaft preventing its oscillation except at the ends of its longitudinal reciprocations.

13. A cylinder-shifting means for multiplex-cylinder phonographs, comprising a longitudinally-movable and rotative reel carrying the cylinders, a shaft mounted to move endwise and to turn, means for imparting successive endwise and oscillatory movement to said shaft, and a device connecting said shaft with the reel for transmitting the motion of the former to the latter.

14. A cylinder-shifting means for multiplex-cylinder phonographs, comprising a longitudinally-movable and rotative reel carrying the cylinders, a shaft mounted to move endwise and to turn, means for imparting successive endwise and oscillatory motion to said shaft, and a device connected with and disconnected from said reel by the reciprocatory movement of said shaft and serving when engaged with the reel to turn the same in one direction.

15. A cylinder-shifting means for multiplex-cylinder phonographs comprising a cylinder-carrying reel having holes in one head, a shaft mounted to move endwise and to turn, means for imparting successive endwise and oscillatory motion to said shaft, an arm attached to said shaft, a pin projecting from said arm and designed to be inserted in said holes and withdrawn therefrom by the endwise motion of said shaft.

16. In a multiplex-cylinder phonograph, the combination with the base, and the cylinder-carrying reel having two series of holes in one head, of a pin projecting from the base and designed to engage the holes of one series, a shaft, means for causing said shaft both to reciprocate and to oscillate at each end of its reciprocations, and a pin carried by said shaft and inserted into and withdrawn from the holes of the second series by the reciprocations of said shaft.

17. In a multiplex-cylinder phonograph, the combination with the cylinder-carrying reel, of a shaft, a lug movable therewith, a spring-arm having a ledge to engage said lug, a pin projecting from the machine-base, a device carried by the shaft to engage said pin, means coacting with said arm and lug and with the pin and said device for causing said shaft to reciprocate and to oscillate at the ends of its reciprocations, and means for connecting said shaft with said reel.

18. In a multiplex-cylinder phonograph, the combination with the cylinder-carrying reel having holes in one head, of a shaft, a relatively-fixed spring-arm and pin adjacent to said shaft, devices movable with the shaft to be engaged by the spring-arm and pin respectively so as to lock said shaft against oscillation but permit it to reciprocate, said locking devices being disengaged by endwise movement of said shaft, and means, coacting with said locking devices for reciprocating said shaft, said means also serving to oscillate the shaft at the ends of its reciprocations, and a pin carried by said shaft and inserted into and withdrawn from said holes by the endwise movement of said shaft.

19. The combination with a guided sleeve, having a nut-carrying arm at one end and a diaphragm-arm at its other end, both of said arms projecting forward from the sleeve, the nut-section on one arm, and the feed-shaft engaged thereby, of the cylinder - shifting mechanism, having a shaft, an eccentric fixed on said shaft, a rod engaging said arms and operating when turned to simultaneously elevate both of the same, and a handle projecting from said rod and engaging said eccentric.

20. The combination with a reel, a shaft having a handle, a second shaft located between said handle-shaft and reel and having means to engage the reel, and means for translating rotary motion of the handle-shaft into successive endwise and rotary motion of the second shaft, of an eccentric on said handle-shaft, the feed-shaft, the connected arms carrying the feed-nut and diaphragm-support, respectively, a rod engaging said arms and elevating the same simultaneously, and a handle for said rod, engaging said eccentric.

21. A reel, a shaft, having a segment provided with a handle for turning said shaft, a means operated by said shaft to move the reel endwise and turn it, the feed-shaft, the connected arms carrying the nut-section and diaphragm-support, respectively, means operated by the first-mentioned shaft for elevating said connected arms simultaneously with the movement of the reel, and a connection between said segment and the arms for drawing the latter to the starting-place when elevated.

22. The feed-shaft, connected arms carrying the shaft-engaging device and diaphragm-support, respectively, a reel, a shaft having a handle, means operated by the handle-shaft for shifting the reel, an eccentric fixed on said handle-shaft, a U-shaped pivoted support for said connected arms, and a rod connected with said support and engaging said eccentric.

23. In a multiplex - cylinder phonograph, the combination with the feed-shaft, and the connected arms carrying the shaft-engaging device and diaphragm-support, respectively, of the cylinder-shifting mechanism, embodying a handle-shaft, an eccentric mounted on said shaft, a segment also mounted on said shaft, a rod engaging said connected arms, an elevating-handle for said rod, engaging said eccentric, and means connecting said segment with one of said arms.

24. The feed-shaft, connected arms carrying the shaft - engaging device and diaphragm-support, respectively, one of said arms having a shoulder, and an elevating means for said arms, consisting of a pivoted device which when raised will engage said shoulder and hold the arms elevated, and a handle projecting from said device by which it may be elevated.

25. In a multiplex-cylinder phonograph, the combination with the cylinder-carrying reel and its shifting mechanism, said shifting mechanism having a handle-shaft by which it is operated, of the feed-shaft, the connected arms carrying the shaft-engaging device and diaphragm-support, respectively, one of said arms having a shoulder, and a pivoted elevating device for said arms, said device being arranged to engage said shoulder and hold the arms elevated an arm projecting from said device and having a free end in position to be lifted by hand, and an eccentric engaging the latter arm for lifting it automatically during the shifting of the cylinders.

26. In a phonograph, the combination with the feed-shaft, and an arm projecting forwardly over the same, of a spring-arm secured at one end to said arm, a half-nut secured to the free end of said spring-arm, and an adjusting - screw for said spring - arm, threaded through the first-mentioned arm, substantially as described.

27. In a phonograph, the combination with the feed-shaft, and an arm projecting forwardly over the same, of a spring-arm secured at one end to the first-mentioned arm by a screw, a half-nut adjustably secured to said spring - arm, and an adjusting - screw threaded through said first-mentioned arm and extending through an elongated slot in said spring-arm.

28. In a multiplex-cylinder phonograph, the combination with the base and the axial bar or rod supported at one end by said base, of the cylinder-carrying reel rotatably and slidably mounted on said bar and removable therefrom, and the removable cap on the end of said bar, substantially as described and for the purposes specified.

29. In a multiplex - cylinder phonograph, the combination with the base, of an axial bar or rod projecting therefrom, said bar having L-shaped channels or recesses in its end, a rotatable and slidable cylinder - carrying reel removably mounted on said bar, and a removable cap for the end of said bar having pins to engage the channels therein.

30. In a multiplex-cylinder phonograph, the combination with the base, and the axial bar or rod supported at one end by said base, of the cylinder-carrying reel rotatably and slidably mounted on said bar and removable therefrom, a coiled spring on the free end of said bar, engaging said reel, and a removable cap on the end of said bar engaged by the outer end of said spring.

31. In a multiplex-cylinder phonograph, the combination with the base, the axial bar supported near one end by said base and having an opening in its inner end, and the rotatable and slidable cylinder-carrying reel mounted on said bar, of a shaft projecting at one end into said opening, a handle-shaft having an opening to receive the other end of the first-mentioned shaft, devices for translating oscillatory motion of the handle-shaft into successive endwise and oscillatory motion of the first-mentioned shaft, and devices connecting said first-mentioned shaft with the reel.

In testimony whereof I affix my signature in presence of two witnesses.

GEORGE V. GRESS.

Witnesses:
C. J. STOCKMAN,
LUTHER V. MOULTON.